(12) United States Patent  
Miyashita

(10) Patent No.: US 7,528,519 B2  
(45) Date of Patent: May 5, 2009

(54) PERMANENT MAGNET ROTARY MOTOR

(75) Inventor: Toshihito Miyashita, Tokyo (JP)

(73) Assignee: Sanyo Denki Co., Ltd., Tokyo (JP)

( * ) Notice: Subject to any disclaimer, the term of this patent is extended or adjusted under 35 U.S.C. 154(b) by 416 days.

(21) Appl. No.: 11/532,932

(22) Filed: Sep. 19, 2006

(65) Prior Publication Data

US 2007/0063610 A1    Mar. 22, 2007

(30) Foreign Application Priority Data

Sep. 20, 2005    (JP) .............................. 2005-272564

(51) Int. Cl.
  *H02K 1/16* (2006.01)
  *H02K 1/18* (2006.01)
(52) U.S. Cl. .................... 310/216; 310/218; 310/254
(58) Field of Classification Search ......... 310/216–218, 310/254, 258–259; 29/596–598
  See application file for complete search history.

(56) References Cited

U.S. PATENT DOCUMENTS

| | | | | |
|---|---|---|---|---|
| 6,225,725 | B1 * | 5/2001 | Itoh et al. ................... | 310/254 |
| 6,483,221 | B1 * | 11/2002 | Pawellek et al. ............. | 310/216 |
| 6,822,364 | B2 * | 11/2004 | Suzuki et al. ............... | 310/218 |
| 2006/0214533 | A1 * | 9/2006 | Miyashita et al. ............ | 310/216 |

FOREIGN PATENT DOCUMENTS

| | | |
|---|---|---|
| JP | 02-007839 | 1/1990 |
| JP | 2000-032690 | 1/2000 |
| JP | 2000-010539 | 1/2002 |
| JP | 2002-199630 | 7/2002 |
| JP | 2005-080365 | 3/2005 |

* cited by examiner

*Primary Examiner*—Tran N Nguyen
(74) *Attorney, Agent, or Firm*—Rankin, Hill & Clark LLP

(57) ABSTRACT

The present invention provides a permanent magnet rotary motor in which cogging torque can be reduced without largely reducing the torque. When an angle formed between two virtual lines respectively connecting a center of a rotary shaft and both ends of a first type connecting portion 21A is defined as a first angle $\theta 1$ and an angle formed between two virtual lines connecting the center of the rotary shaft and both ends of a second type connecting portion 21B is defined as a second angle $\theta 2$, the relationship between the first angle $\theta 1$ and the second angle $\theta 2$ is $\theta 1 > \theta 2$. A through-hole H1 is formed in the first type connecting portion 21A, which extends from a center position of the first type connecting portion 21A as viewed in an axial direction of the rotary shaft toward both sides in the axial direction. A through-hole H2 is formed in the second type connecting portion 21B, which extends from a center position of the second type connecting portion 21B as viewed in the axial direction toward both sides in the axial direction. The length, in a circumferential direction, of the through-hole H2 formed in the first type connecting portion 21A is longer than the length, in the circumferential direction, of the through-hole H2 formed in the second type connecting portion 21B. The length, in the axial direction, of the through-hole H1 formed in the first type connecting portion 21A is shorter than a length, in the axial direction, of the through-hole H2 formed in the second type connecting portion 21B.

13 Claims, 10 Drawing Sheets

PERMANENT MAGNET ROTARY MOTOR

FIELD OF THE INVENTION

The present invention relates to a permanent magnet rotary motor.

BACKGROUND OF THE INVENTION

Conventionally, permanent magnet rotary motors including a rotor having permanent-magnet magnetic pole sections composed of permanent magnets and a stator having a stator core and exciting winding sections, have been used. As a stator core, there is known such a stator core that has an annular yoke and magnetic pole constituent member disposed inside the yoke. In the motor of this kind, the magnetic pole constituent member comprises a plurality of pole columns, magnetic pole surface constituent sections formed on the pole column and connecting portions connecting two adjacent sections among the magnetic pole surface constituent sections. Japanese Patent Publication Application No. 2000-32690 discloses a permanent magnet rotary motor in which an annular yoke and magnetic pole constituent members are arranged to fit with each other for increasing the ratio of a volume occupied by windings and facilitating fabrication thereof. Japanese Patent Publication Application No. 2002-199630 discloses a permanent magnet rotary motor in which pole columns are disposed at unequal intervals to vary the dimensions between adjacent pole columns to reduce the cogging torque. Further, Japanese Patent Publication Application No. 2002-10539 discloses a permanent magnet rotary motor in which a plurality of holes are formed discontinuously along an axial direction in its connecting portions and are opened both inwardly in a radial direction and toward a slot between two adjacent pole columns. The plurality of holes are formed in order to prevent leakage of magnetic flux among the magnetic poles.

It has been demanded for the permanent magnet rotary motor that the cogging torque should be reduced while maintaining the torque. However, the above-mentioned conventional permanent magnet rotary motors have a limitation in reducing the cogging torque.

SUMMARY OF THE INVENTION

An object of the present invention is to provide a permanent magnet rotary motor in which the cogging torque can be reduced without largely reducing the torque.

Another object of the present invention is to provide a permanent magnet rotary motor in which the inductance can be balanced in its exciting winding sections.

Still another object of the present invention is to provide a permanent magnet rotary motor, which can be easily manufactured and in which the cogging torque can be reduced.

A permanent magnet rotary motor of the present invention comprises a rotor, a stator core and N (N is an even number of 4 or more) exciting winding sections. The rotor includes a rotor core fixed to a rotary shaft and a plurality of permanent-magnet magnetic pole sections composed of permanent magnets attached to the rotor core. The stator core includes an annular yoke, N pole columns disposed inside the annular yoke at intervals in a circumferential direction of the yoke with one end of the pole column being connected to the yoke and the other end thereof being positioned on an inner side than the one end in a radial direction of the yoke. The stator core also includes N magnetic pole surface constituent sections respectively formed on the other end of the N pole columns, each having on its inner side a magnetic pole surface facing the rotor, and N connecting portions connecting two adjacent sections among the magnetic pole surface constituent sections. Each of the N connecting portions is formed with one or more through-holes penetrating the connecting portion in the radial direction. The N exciting winding sections are mounted onto the N pole columns of the stator core respectively. In the present invention, the N connecting portions include N/2 first type connecting portions and N/2 second type connecting portions, and the first and second type connecting portions are alternately disposed in a circumferential direction of the rotor. When an angle formed between two virtual lines respectively connecting a center of the rotary shaft and both ends, mutually opposed in the circumferential direction, of the first type connecting portion is defined as a first angle $\theta1$ and an angle formed between two virtual lines respectively connecting the center of the rotary shaft and both ends, mutually opposed in the circumferential direction, of the second type connecting portion is defined as a second angle $\theta2$, a relationship between the first angle $\theta1$ and the second angle $\theta2$ is $\theta1>\theta2$. The first type connecting portion is formed with a through-hole, which extends from a center position of the first type connecting portion as viewed in an axial direction of the rotary shaft toward both sides in the axial direction. The second type connecting portion is formed with a through-hole, which extends from a center position of the second type connecting portion as viewed in the axial direction toward both sides in the axial direction. The length of the through-hole formed in the first type connecting portion is longer than the length of the through-hole formed in the second type connecting portion in the circumferential direction. The length of the through-hole formed in the first type connecting portion is shorter than the length of the through-hole formed in the second type connecting portion in the axial direction.

In the stator core of the permanent magnet rotary motor according to the present invention, an inner circumferential portion of the stator core may be constituted by three parts disposed along the axial direction of the rotary shaft: (1) a part where no through-holes are formed in all of the connecting portions disposed in the circumferential direction; (2) a part where through-holes are alternately formed in the connecting portions disposed in the circumferential direction; and (3) a part where through-holes are formed in all of the connection portions disposed in the circumferential direction. In the part (2), the through-holes are formed only in the second-type connecting portions, the length of which in the circumferential direction is shorter than that of the first type connection portions. If waves of the cogging torque generated in the above three parts can be counteracted on a basis of principle of superposition, the cogging torque can accordingly be reduced. Amplitudes of waves of cogging torque generated at the parts (1), (2) and (3) are defined as S1, S2 and S3 respectively. Then, when positive phase cogging torque is generated at the parts (1) and (2) and negative phase cogging torque is generated at the part (3) (the negative phase is displaced by 180° with respect to the positive phase), the phases have to be arranged so that S1+S2−S3=0 . . . (A). When positive phase cogging torque is generated at the parts (1) and (3) and negative phase cogging torque is generated at the part (2), the phases have to be arranged so that S1−S2+S3=0 . . . (B). When positive phase cogging torque is generated at the part (1) and negative phase cogging torque is generated at the parts (2) and (3), the phases have to be arranged so that S1−S2−S3=0 . . . (C). In the present invention, the first angle $\theta1$ of the first type connecting portion is appropriately larger than the second angle $\theta2$ of the second type connecting portion so that the formulae (A) to (C) are satisfied. Also, in the present invention, by forming the through-holes, the leakage magnetic flux is reduced to prevent the torque from decreasing. As a result, according to the present invention, the cogging torque can be reduced without largely reducing the torque. Further, the inductance in the exciting winding sections can be balanced by alternately disposing in the circumferential direction longer through-holes and shorter through-holes, the shorter through-hole having a length shorter than the longer through-hole in the axial direction.

The first type connecting portion may be formed with a first through-hole, which extends from one end of the first type connecting portion in the axial direction of the rotary shaft toward the other end thereof, and a second through-hole, which extends from the other end of the first type connecting portion in the axial direction toward the one end. And, the second type connecting portion may be formed with a third through-hole, which extends from one end of the second type connecting portion in the axial direction toward the other end thereof, and a fourth through-hole, which extends from the other end of the second type connecting portion in the axial direction toward the one end. In this case, the length, in the circumferential direction, of the first and second through-holes formed in the first type connecting portion is longer than the length, in the circumferential direction, of the third and fourth through-holes formed in the second type connecting portion. The length, in the axial direction, of the first and second through-holes formed in the first type connecting portion is shorter than the length, in the axial direction, of the third and fourth through-holes formed in the second type connecting portion. In this manner also, the cogging torque can be reduced without largely reducing the torque. Also, the inductance in the exciting winding sections can be balanced.

The first through-hole and the second through-hole may be equal to each other in the axial direction, and the third through-hole and the fourth through-hole may be equal to each other in the axial direction. By arranging the through-holes as described above, the cogging torque can be further reduced.

The first type connecting portion can be formed with a through-hole, which extends from one end of the first type connecting portion in the axial direction of the rotary shaft toward the other end thereof; and the second type connecting portion can be formed with a through-hole, which extends from one end of the second type connecting portion in the axial direction toward the other end thereof. In this case, the length, in the circumferential direction, of the through-hole formed in the first type connecting portion is longer than the length, in the circumferential direction, of the through-hole formed in the second type connecting portion. Also, the length, in the axial direction, of the through-hole formed in the first type connecting portion is shorter than the length, in the axial direction, of the through-hole formed in the second type connecting portion. In this manner also, the cogging torque can be reduced without largely reducing the torque. Also, the inductance in the exciting winding sections can be balanced.

A value ($\theta 2/\theta 1$) obtained by dividing the second angle $\theta 2$ by the first angle $\theta 1$ is preferably set to a range of $0.25 < \theta 2/\theta 1 < 0.35$. With this arrangement, the inductance in the exciting winding sections can be more reliably balanced.

The angle range, measured in the circumferential direction, of the through-hole formed in the first type connecting portion may be equal to the first angle $\theta 1$; and the angle range, measured in the circumferential direction, of the through-hole formed in the second type connecting portion may be equal to the second angle $\theta 2$. With this arrangement, the cogging torque can be satisfactorily reduced.

The stator core of the permanent magnet rotary motor according to the present invention includes a yoke and a magnetic pole constituent member disposed inside the yoke. The magnetic pole constituent member may be composed of first-kind, second-kind, and third-kind magnetic pole constituent steel-plate layers which are overlaid on one another. Each of the layers is made of a magnetic steel-plate, and includes a pole column constituent portion partially constituting the pole column and a magnetic pole surface constituent portion partially constituting the magnetic pole surface constituent section. Two different intermediate portions are formed between two adjacent portions among the magnetic pole surface constituent portions included in each of the first-kind to third-kind magnetic pole constituent steel-plate layers; i.e., first intermediate portions and second intermediate portions each have a different angle range measured in the circumferential direction. In the first intermediate portion, an angle formed between two virtual lines respectively connecting a center of the rotor and two ends, mutually opposed in the circumferential direction, of the two adjacent magnetic pole surface constituent portions is a first angle $\theta 1$. In the second intermediate portion, an angle formed between two virtual lines respectively connecting the center of the rotor and two ends, mutually opposed in the circumferential direction, of the two adjacent magnetic pole surface constituent portions is a second angle $\theta 2$, which is smaller than the first angle $\theta 1$. Both of the first and second intermediate portions of the first-kind magnetic pole constituent steel-plate layer are opened to partially form the through-holes. The first intermediate portions of the second-kind magnetic pole constituent steel-plate layer partially constitute the connecting portions, and the second intermediate portions thereof are opened to partially form the through-holes. Both of the first intermediate portions and the second intermediate portions of the third-kind magnetic pole constituent steel-plate layer partially form the connecting portions.

The magnetic pole constituent member is composed of the third-kind magnetic pole constituent steel-plate layer, the second-kind magnetic pole constituent steel-plate layer, the first-kind magnetic pole constituent steel-plate layer, the second-kind magnetic pole constituent steel-plate layer and the third-kind magnetic pole constituent steel-plate layer which are overlaid on one another in this order so that the ratio for the number of layers is 1:2:4:2:1. With this arrangement, the through-hole, which extends from a center position of the first type connecting portion, and the through-hole, which extends from a center position of the second type connecting portion, are formed. It is thus possible to easily manufacture a stator core, in which the length of the through-hole formed in the first type connecting portion is shorter than the length of the through-hole formed in the second type connecting portion, by simply overlaying in the axial direction of the rotor three kinds of magnetic pole constituent steel-plate layers each made of a magnetic steel-plate.

The magnetic pole constituent member may be composed of the first-kind magnetic pole constituent steel-plate layer, the second-kind magnetic pole constituent steel-plate layer, the third-kind magnetic pole constituent steel-plate layer, the second-kind magnetic pole constituent steel-plate layer and the first-kind magnetic pole constituent steel-plate layer which are overlaid on one another in this order so that the ratio for the number of layers is 2:2:2:2:2. With this arrangement, the first and second through-holes are formed in both ends of the first type connecting portion, and the third and fourth through-holes are formed in both ends of the second type connecting portion. It is thus possible to easily manufacture a stator core in which the length of the first and second through-holes is shorter than the length of the third and fourth through-holes, by simply overlaying in the axial direction of the rotor three kinds of magnetic pole constituent steel-plate layers each made of a magnetic steel-plate.

The magnetic pole constituent member may be composed of the third-kind magnetic pole constituent steel-plate layer, the second-kind magnetic pole constituent steel-plate layer and the first-kind magnetic pole constituent steel-plate layer which are overlaid on one another in this order so that the ratio for the number of layers is 2:4:4. With this arrangement, it is possible to easily manufacture a stator core in which the through-hole is formed at one end of the first type connecting portion, the through-hole is formed at one end of the second type connecting portion, and the length of the through-hole formed in the first type connecting portion is shorter than the length of the through-hole formed in the second type connecting portion, by simply overlaying in the axial direction of the rotor three kinds of magnetic pole constituent steel-plate layers each made of a magnetic steel-plate.

According to the present invention, the inner circumferential portion of the stator core may be constituted by three parts disposed along the axial direction of the rotary shaft: (1) a part where no through-holes are formed in all of the connecting portions disposed in the circumferential direction; (2) a part where through-holes are alternately formed in the connecting portions disposed in the circumferential direction; and (3) a part where through-holes are formed in all of the connection portions disposed in the circumferential direction. With this arrangement, the cogging torque can be reduced without largely reducing the torque. In addition, the inductance in the exciting winding sections can be balanced by alternately disposing in the circumferential direction longer through-holes and shorter through-holes, the shorter through-hole having a length shorter than the longer through-hole in the axial direction.

DETAILED DESCRIPTION OF PREFERRED EMBODIMENTS

Figure 1:
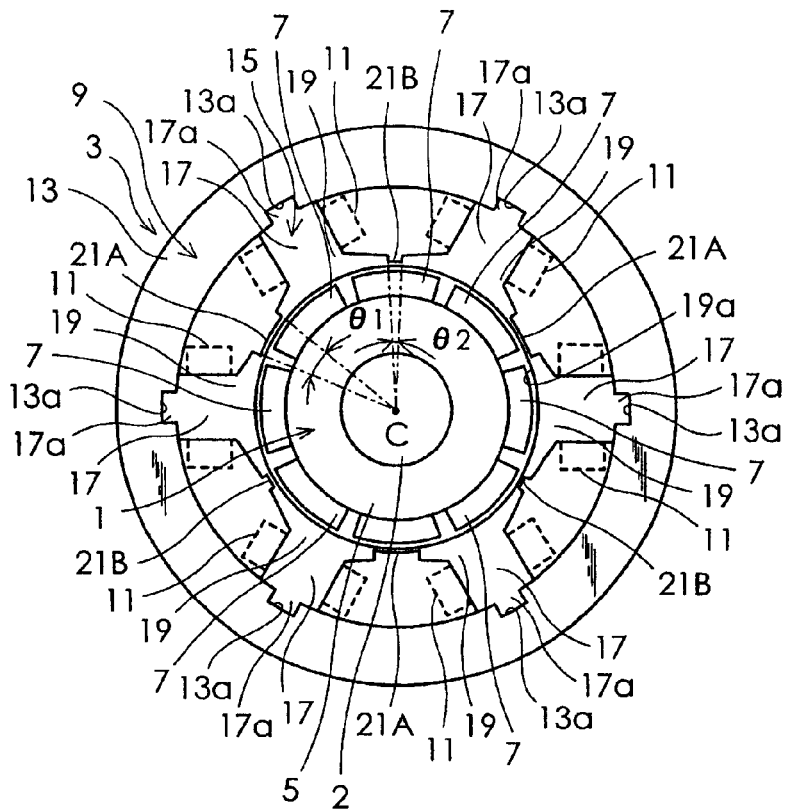
FIG. 1 is a schematic diagram of a permanent magnet rotary motor in accordance with a first embodiment of the present invention.

Embodiments of the present invention will be hereinafter described in detail with reference to the accompanying drawings. FIG. 1 is a schematic diagram of a permanent magnet rotary motor according to a first embodiment of the present invention. The permanent magnet rotary motor of the first embodiment comprises a rotor 1 and a stator 3 as shown in FIG. 1. The rotor 1 includes a rotor core 5 fixed to a rotary shaft 2 and eight permanent-magnet magnetic pole sections composed of plate-like permanent magnets 7, which are disposed on an outer surface of the rotor core 5 at equal intervals in a circumferential direction of the rotor core 5. In this embodiment, one permanent magnet 7 constitutes one permanent-magnet magnetic pole section. The rotor core 5 is composed of a plurality of electromagnetic steel-plates which are overlaid on one another. The eight permanent magnets 7 are arranged on the surface of the rotor core 5 so that N-pole and S-pole appear alternately along the circumferential direction.

Figure 2:
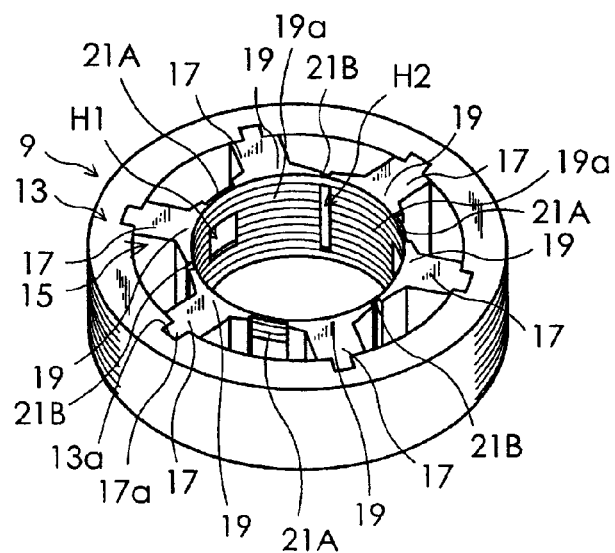
FIG. 2 is a perspective view of a stator core used in the permanent magnet rotary motor shown in FIG. 1.
Figure 3:
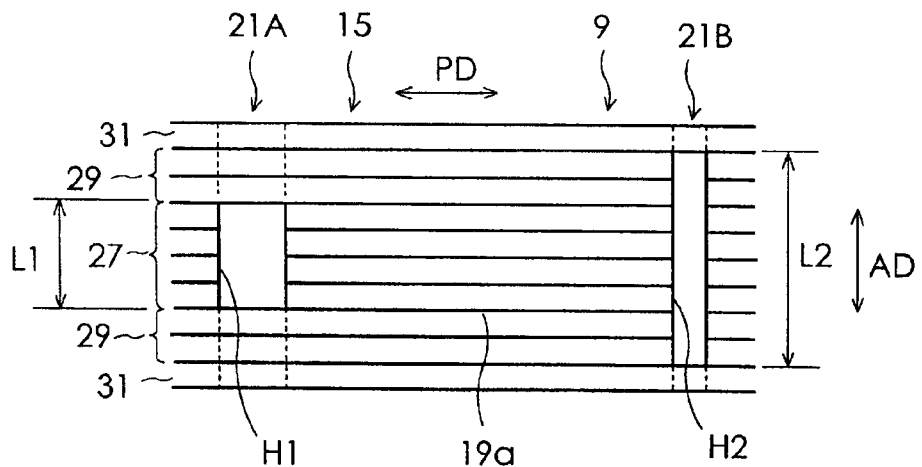
FIG. 3 is a partial illustration of a stator core used in the permanent magnet rotary motor shown in FIG. 1 as viewed from an inner side (rotor side) thereof.

The stator 3 includes a stator core 9 and exciting winding sections 11. For facilitating understanding, the exciting winding sections 11 are indicated with a broken line in FIG. 1. The stator core 9 includes an annular yoke 13 and a magnetic pole constituent member 15 arranged inside the annular yoke 13 as shown in FIGS. 1 to 3. FIG. 2 is a perspective view of the stator core 9 and FIG. 3 is a partial illustration of the stator core 9 as viewed from the inside thereof (rotor side). The magnetic pole constituent member 15 is composed of N pole columns 17 (N is an even number of 4 or more: in this embodiment, N=6), magnetic pole surface constituent sections 19 respectively formed on the end portions of the pole columns 17, and N connecting portions 21A, 21B (in this embodiment, N=6) which connect six magnetic pole surface constituent sections 19 to each other in an annular relation. The pole columns 17 are arranged inside the yoke 13 at intervals in the circumferential direction, and each of the pole columns 17 has one end, which is connected to the yoke 13, and the other end, which is positioned at an inner side than the one end in a radial direction of the yoke. In this embodiment, each of the pole columns 17 has a projection 17a on the one end. The projection 17a is fitted into a recess 13a formed in the inner periphery of the yoke 13, thereby connecting the pole column 17 to the yoke 13. Each of the magnetic pole surface constituent sections 19 has on its inner side a magnetic pole surface 19a, which is formed on the other end of the pole column 17 and faces the rotor 1.

The N (6) connecting portions 21A, 21B respectively connect two adjacent sections among the magnetic pole surface constituent sections 19, and include N/2 (3) first type connecting portions 21A and N/2 (3) second type connecting portions 21B. The first type connection portions 21A and the second type connecting portions 21B are alternately disposed in a circumferential direction of the rotor. When an angle formed between two virtual lines respectively connecting a center C of the rotary shaft 2 of the rotor 1 and both ends, mutually opposed in the circumferential direction, of the first type connecting portion 21A is defined as a first angle θ1 and an angle formed between two virtual lines respectively connecting the center C of the rotary shaft 2 of the rotor 1 and both ends, mutually opposed in the circumferential direction, of the second type connecting portion 21B is defined as a second angle θ2, a relationship between the first angle θ1 and the second angle θ2 is θ1>θ2. In this embodiment, a value obtained by dividing the second angle θ2 by the first angle θ1 (θ2/θ1) is within a range of 0.25<θ2/θ1<0.35.

The first type connecting portion 21A is formed with a through-hole H1, which extends from a center position of the first type connecting portion 21A as viewed in an axial direction of the rotary shaft 2 toward both sides in the axial direction (the axial direction of the rotary shaft 2 indicated with an arrow AD) as shown in FIG. 3 in detail. Also, the second type connecting portion 21B is formed with a through-hole H2, which extends from a center position of the second type connecting portion 21B as viewed in the axial direction toward both sides in the axial direction (indicated with arrow AD). In this embodiment, an angle range measured in the circumferential direction (in a circumferential direction of the rotary shaft 2 indicated with an arrow PD) of the through-hole H1 formed in the first type connecting portion 21A is equal to the first angle θ1. An angle range measured in the circumferential direction of the through-hole H2 formed in the second type connecting portion 21B is equal to the second angle θ2. Therefore, the length, in the circumferential direction, of the through-hole H1 formed in the first type connecting portion 21A is longer than the length, in the circumferential direction, of the through-hole H2 formed in the second type connecting portion 21B. Further, the length L1, in the axial direction, of the through-hole H1 formed in the first type connecting portion 21A is shorter than the length L2, in the axial direction, of the through-hole H2 formed in the second type connecting portion 21B. In this embodiment, the ratio of the length L1 of the through-hole H1 with respect to the length L2 of the through-hole H2 is 1:2.

Figure 4:
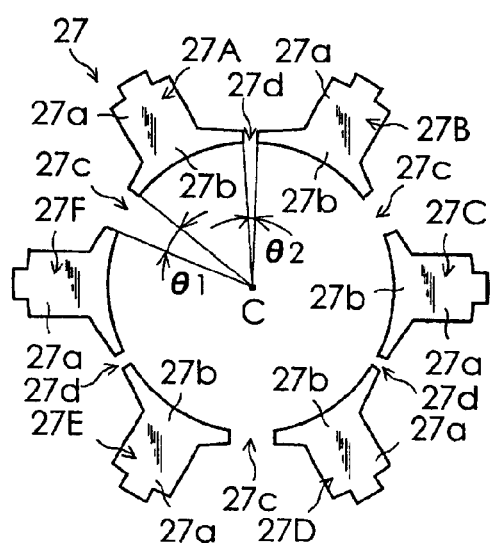
FIG. 4 is a plan view of a first-kind magnetic pole constituent steel-plate layer of the stator core used in the permanent magnet rotary motor shown in FIG. 1.

In this embodiment, the magnetic pole constituent member 15 is composed of a plurality of magnetic steel-plates, which are overlaid on one another. In particular, the magnetic pole constituent member 15 is composed of a combination of a first-kind magnetic pole constituent steel-plate layer 27 shown in FIG. 4, a second-kind magnetic pole constituent steel-plate layer 29 shown in FIG. 5 and a third-kind magnetic pole constituent steel-plate layer 31 shown in FIG. 6, which are overlaid on one another. The first-kind magnetic pole constituent steel-plate layer 27 is composed of six divided magnetic steel-plates 27A to 27F as shown in FIG. 4. Each of the magnetic steel-plates includes a pole column constituent portion 27a that constitutes the pole column 21 and a magnetic pole surface constituent portion 27b that constitutes the magnetic pole surface constituent section 19. Two kinds of intermediate portions are formed between two ends, adjacent to each other in the circumferential direction, of the magnetic pole surface constituent portions 27b. That is, the intermediate portions are a first intermediate portion 27c in which the first angle θ1 is formed between two virtual lines respectively connecting two ends of the first intermediate portion 27c and the center C of the rotor, and a second intermediate portions 27d in which the second angle θ2, smaller than the first angle θ1, is formed between two virtual lines respectively connecting the two ends of the second intermediate portion 27d and the center C of the rotor. The first intermediate portions 27c and the second intermediate portions 27d are disposed alternately in the circumferential direction. Both of the first intermediate portions 27c and the second intermediate portions 27d are opened to partially form the through-holes H1 and H2.

Figure 5:
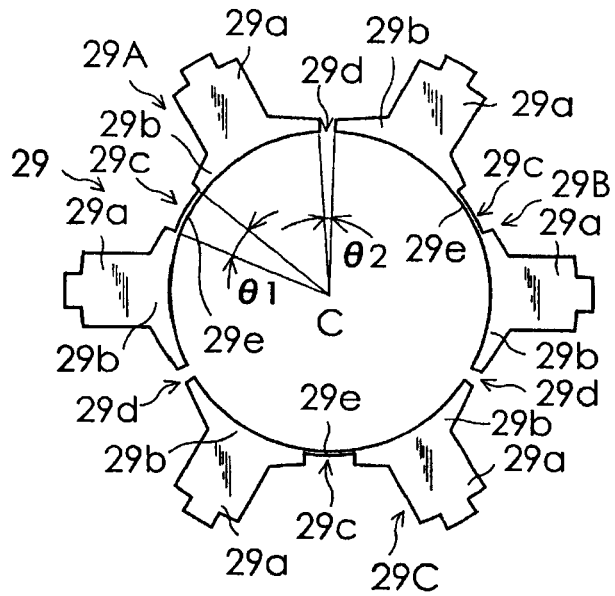
FIG. 5 is a plan view of a second-kind magnetic pole constituent steel-plate layer of the stator core used in the permanent magnet rotary motor shown in FIG. 1.

As shown in FIG. 5, the second-kind magnetic pole constituent steel-plate layer 29 is composed of three divided magnetic steel-plates 29A to 29C. Each of the magnetic steel-plates includes two pole column constituent portions 29a that constitute the pole column 21 and two magnetic pole surface constituent portions 29b that constitute the magnetic pole surface constituent section 19. Two kinds of intermediate portions are formed between two ends, adjacent to each other in the circumferential direction, of the magnetic pole surface constituent portions 29b. That is, the intermediate portions are a first intermediate portion 29c in which the first angle θ1 is formed between two virtual lines respectively connecting two ends of the first intermediate portions 29c and the center C of the rotor, and a second intermediate portions 29d in which the second angle θ2, smaller than the first angle θ1, is formed between two virtual lines respectively connecting the two ends of the second intermediate portions 29d and the center C of the rotor. The first intermediate portion 29c and the second intermediate portion 29d are alternately disposed in the circumferential direction. The first intermediate portion 29c is formed of a connecting-portion constituent portion 29e that partially constitutes the first type connecting portion 21A. The second intermediate portion 29d is opened to partially form the through-hole H2.

Figure 6:
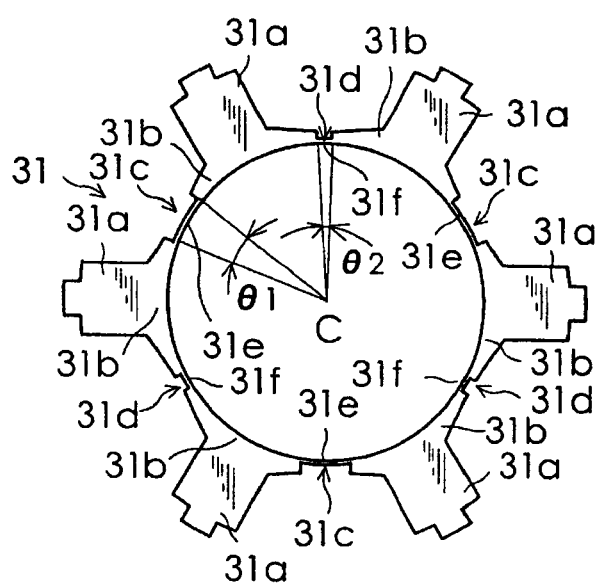
FIG. 6 is a plan view of a third-kind magnetic pole constituent steel-plate layer of the stator core used in the permanent magnet rotary motor shown in FIG. 1.

As shown in FIG. 6, the third-kind magnetic pole constituent steel-plate layer 31 is composed of a magnetic steel-plate and includes six pole column constituent portions 31a that constitute the pole columns 21, and six magnetic pole surface constituent portions 31b that constitute the magnetic pole surface constituent sections 19. Two kinds of intermediate portions are formed between two ends, adjacent to each other in the circumferential direction, the magnetic pole surface constituent portions 31b. That is, the intermediate portions are a first intermediate portion 31c in which the first angle θ1 is formed between two virtual lines respectively connecting two ends of the intermediate portions 31c and the center C of the rotor, and a second intermediate portions 31d in which the second angle θ2, smaller than the first angle θ1, is formed between two virtual lines respectively connecting the two ends of the intermediate portion 31*d* and the center C of the rotor. The first intermediate portion 31*c* and the second intermediate portion 31*d* are alternately disposed in the circumferential direction. The first intermediate portion 31*c* is formed of a connecting-portion constituent portion 31*e* that partially constitutes the first type connecting portion 21A, and the second intermediate portion 31*d* is formed of a connecting-portion constituent portion 31*f* that partially constitutes the second type connecting portion 21B.

As shown in FIG. 3, the magnetic pole constituent member 15 is composed of the third-kind magnetic pole constituent steel-plate layer 31, the second-kind magnetic pole constituent steel-plate layers 29, the first-kind magnetic pole constituent steel-plate layers 27, the second-kind magnetic pole constituent steel-plate layers 29 and the third-kind magnetic pole constituent steel-plate layer 31, which are overlaid on one another in this order so that the ratio for the number of plates is 1:2:4:2:1.

Figure 7:
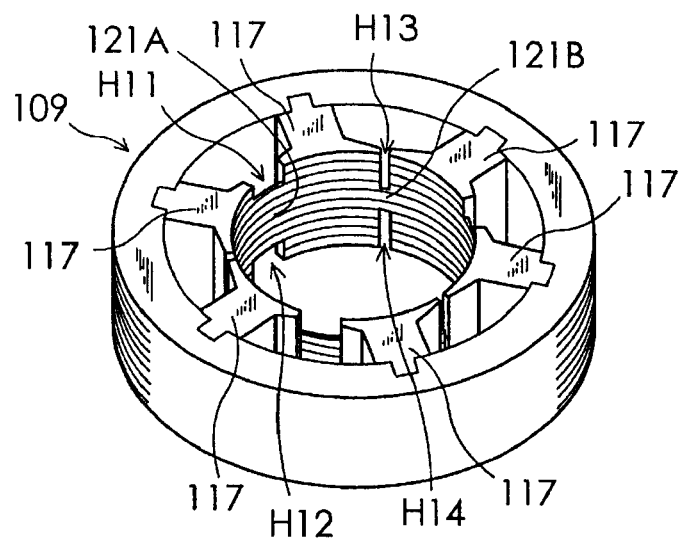
FIG. 7 is a perspective view of a stator core used in a permanent magnet rotary motor in accordance with a second embodiment of the present invention.
Figure 8:
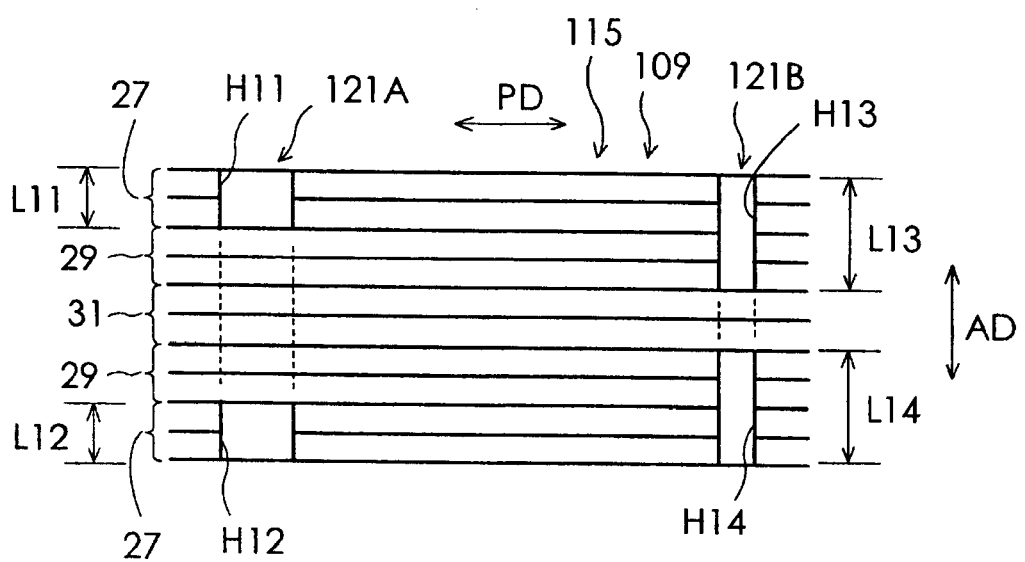
FIG. 8 is a partial illustration of the stator core used in the permanent magnet rotary motor shown in FIG. 7 as viewed from an inner side (rotor side) thereof.

As a result, the inner circumferential portion of the stator core (constituted by the magnetic pole surface constituent section 19, and the first and second type connecting portions 21A, 21B) are constituted by three parts disposed along the axial direction of the rotary shaft: (1) a part constituted by the third-kind magnetic pole constituent steel-plate layer 31 where no through-holes are formed in all of the connecting portions disposed in the circumferential direction; (2) a part constituted by the second-kind magnetic pole constituent steel-plate layer 29 where through-holes are alternately formed in the connecting portions disposed in the circumferential direction; and (3) a part constituted by the first-kind magnetic pole constituent steel-plate layer 27 where through-holes are formed in all of the connection portions disposed in the circumferential direction. FIG. 7 is a perspective view of a stator core 109 used in a permanent magnet rotary motor in accordance with a second embodiment of the present invention. FIG. 8 is a partial illustration of the stator core 109 used in the permanent magnet rotary motor shown in FIG. 7 as viewed from an inner side (rotor side) thereof. The permanent magnet rotary motor in accordance with the second embodiment has the same structure as that of the permanent magnet rotary motor in accordance with the first embodiment except for the structure of the connecting portion of the stator core. In the permanent magnet rotary motor in this embodiment, a first type connecting portion 121A is formed with a first through-hole H11, which extends from one end toward the other end of the first type connecting portion 121A in an axial direction (arrow AD) of the rotary shaft 2, and a second through-hole H12, which extends from the other end toward the one end of the first type connecting portion 121A in the axial direction. Also, the second type connecting portion 121B is formed with a third through-hole H13, which extends from one end toward the other end of the second type connecting portion 121B in the axial direction, and a fourth through-hole H14, which extends from the other end toward the one end of the second type connecting portion 121B in the axial direction. A length L11, in the axial direction, of the first through-hole H11 is equal to a length L12, in the axial direction, of the second through-hole H12. A length L13, in the axial direction, of the third through-hole H13 is equal to a length L14, in the axial direction, of the fourth through-hole H14. Further, the lengths L11, L12, in the axial direction, of the first and second through-holes H11 and H12 formed in the first type connecting portion 121A is respectively shorter than the length L13, L14, in the axial direction, of the third and fourth through-holes H13 and H14 formed in the second type connecting portion. In this embodiment, the ratio between the lengths L11, L12 of the through-holes H11 and H12 and the lengths L13, L14 of the through-holes H13 and H14 is 1:2.

In this embodiment, the magnetic pole constituent member 115 is composed of the first-kind magnetic pole constituent steel-plate layers 27 shown in FIG. 4, the second-kind magnetic pole constituent steel-plate layers 29 shown in FIG. 5, the third-kind magnetic pole constituent steel-plate layers 31 shown in FIG. 6, the second-kind magnetic pole constituent steel-plate layers 29 and the first-kind magnetic pole constituent steel-plate layers 27, which are overlaid in this order so that the ratio for the number of plates is 2:2:2:2:2.

Figure 9:
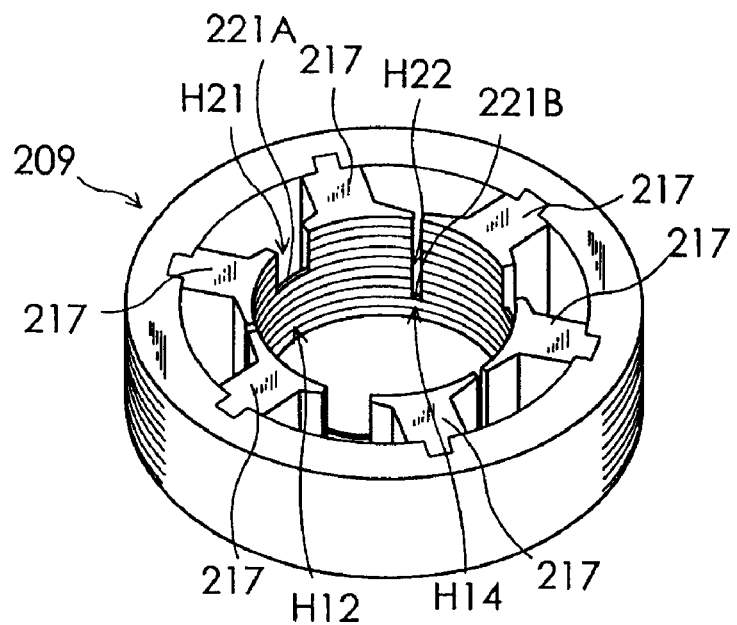
FIG. 9 is a perspective view of a stator core used in a permanent magnet rotary motor in accordance with a third embodiment of the present invention.
Figure 10:
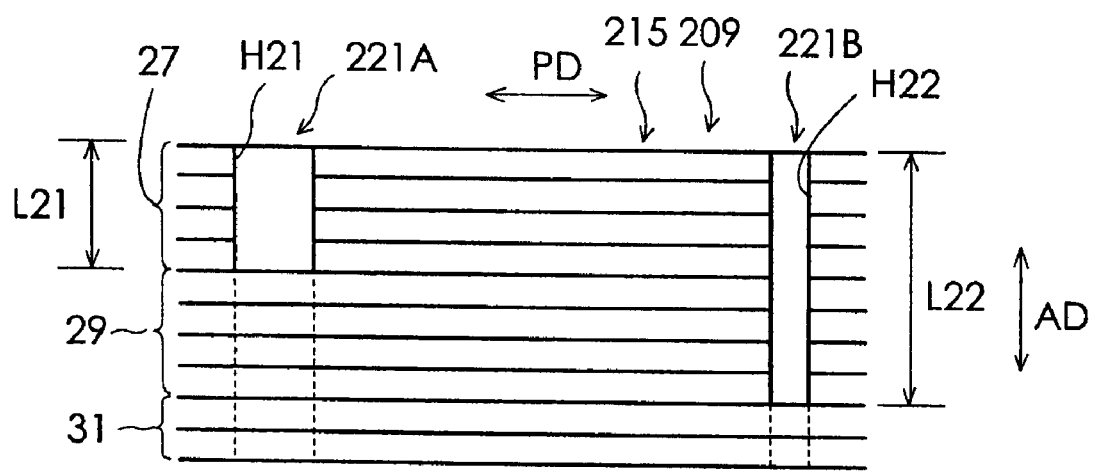
FIG. 10 is a partial illustration of the stator core used in the permanent magnet rotary motor shown in FIG. 9 as viewed from an inner side (rotor side) thereof.

FIG. 9 is a perspective view of a stator core 209 used in a permanent magnet rotary motor in accordance with a third embodiment of the present invention. FIG. 10 is a partial illustration of the stator core 209 used in the permanent magnet rotary motor shown in FIG. 9 as viewed from an inner side (rotor side) thereof. The permanent magnet rotary motor in accordance with the third embodiment has the same structure as that of the permanent magnet rotary motor in accordance with the first embodiment except for the structure of the connecting portion of the stator core. In the permanent magnet rotary motor in this embodiment, the first type connecting portion 221A is formed with a through-hole H21, which extends from one end toward the other end of the first type connecting portion 221A in the axial direction of the rotary shaft 2 (arrow AD). The second type connecting portion 221B is formed with a through-hole H22, which extends from one end toward the other end of the second type connecting portion 221B in the axial direction. The length L21, in the axial direction, of the through-hole H21 formed in the first type connecting portion 221A is shorter than the length L22, in the axial direction, of the through-hole H22 formed in the second type connecting portion 221B. In this embodiment, the ratio between the length L21 of the through-hole H21 and the length L22 of the through-hole H22 is 1:2.

In this embodiment, the magnetic pole constituent member 215 is constructed of the third-kind magnetic pole constituent steel-plate layers 31 shown in FIG. 6, the second-kind magnetic pole constituent steel-plate layers 29 shown in FIG. 5 and the first-kind magnetic pole constituent steel-plate layers 27 shown in FIG. 4 which are overlaid in this order so that the ratio for the number of plates is 2:4:4.

Figure 11:
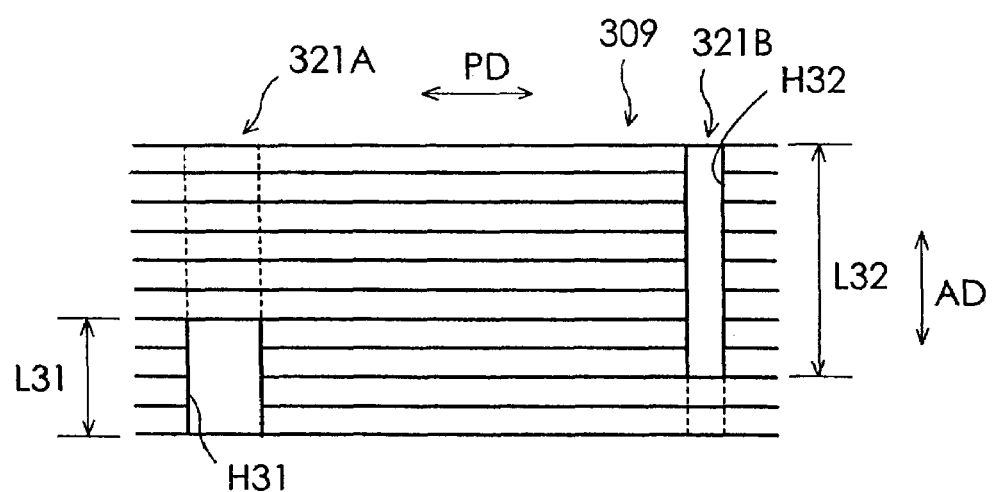
FIG. 11 is a partial illustration of a stator core used in a permanent magnet rotary motor in accordance with a varied or modified embodiment of the present invention.

FIG. 11 is a partial illustration of a stator core 309 used in a permanent magnet rotary motor in accordance with a varied or modified embodiment of the present invention, as viewed from an inner side (rotor side) thereof. The permanent magnet rotary motor in accordance with the third embodiment has the same structure as that of the permanent magnet rotary motor in accordance with the first embodiment except for the structure of the connecting portion of the stator core. In the permanent magnet rotary motor in this embodiment, the first type connecting portion 321A is formed with a through-hole H31, which extends from one end toward the other end of the first type connecting portion 321A in the axial direction of the rotary shaft 2 (arrow AD). The second type connecting portion 321B is formed with a through-hole H32, which extends from one end toward the other end of the second type connecting portion 321B in the axial direction. The length L31, in the axial direction, of the through-hole H31 formed in the first type connecting portion 321A is shorter than the length L32, in the axial direction, of the through-hole H32 formed in the second type connecting portion 321B. In this embodiment, the ratio between the length L31 of the through-hole H31 and the length L32 of the through-hole H32 is 1:2.

Figure 12:
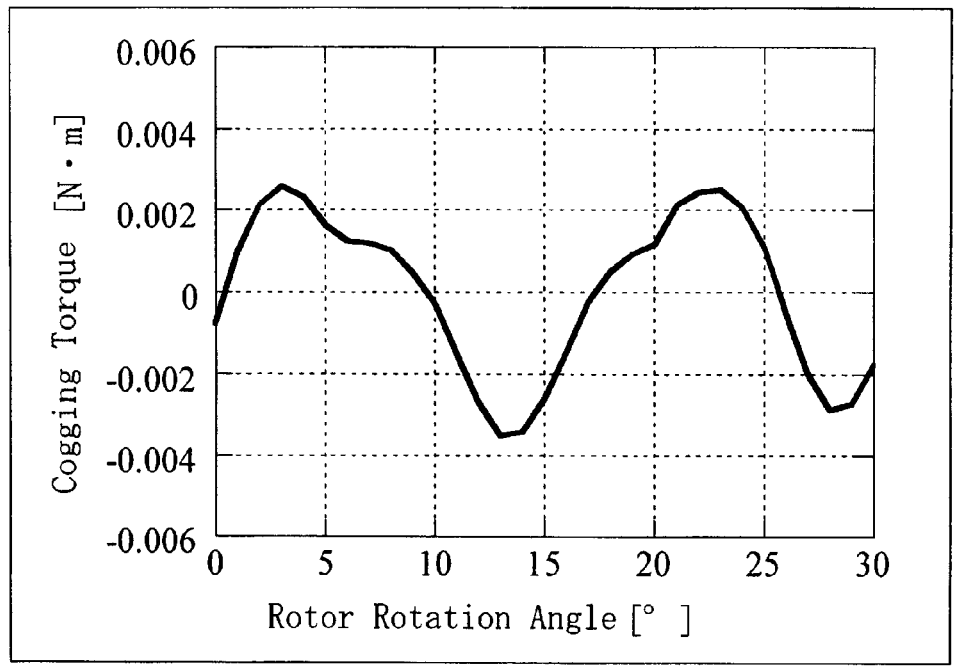
FIG. 12 is a chart showing a relationship between the rotation angle of the rotor and the cogging torque in the permanent magnet rotary motor of the first embodiment.
Figure 13:
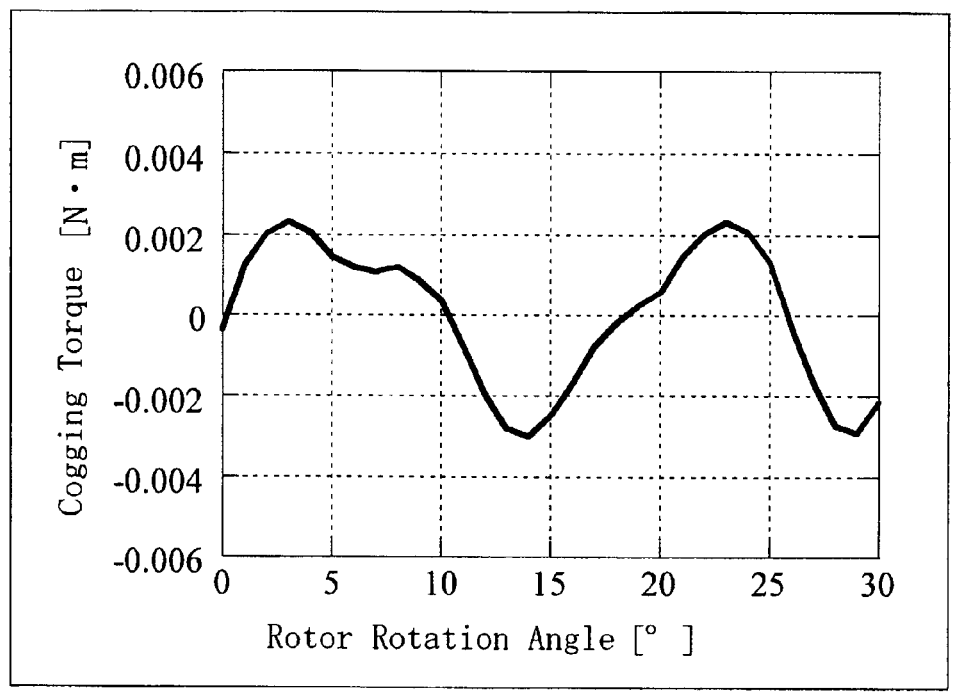
FIG. 13 is a chart showing a relationship between the rotation angle of the rotor and the cogging torque in the permanent magnet rotary motor of the second embodiment.
Figure 14:
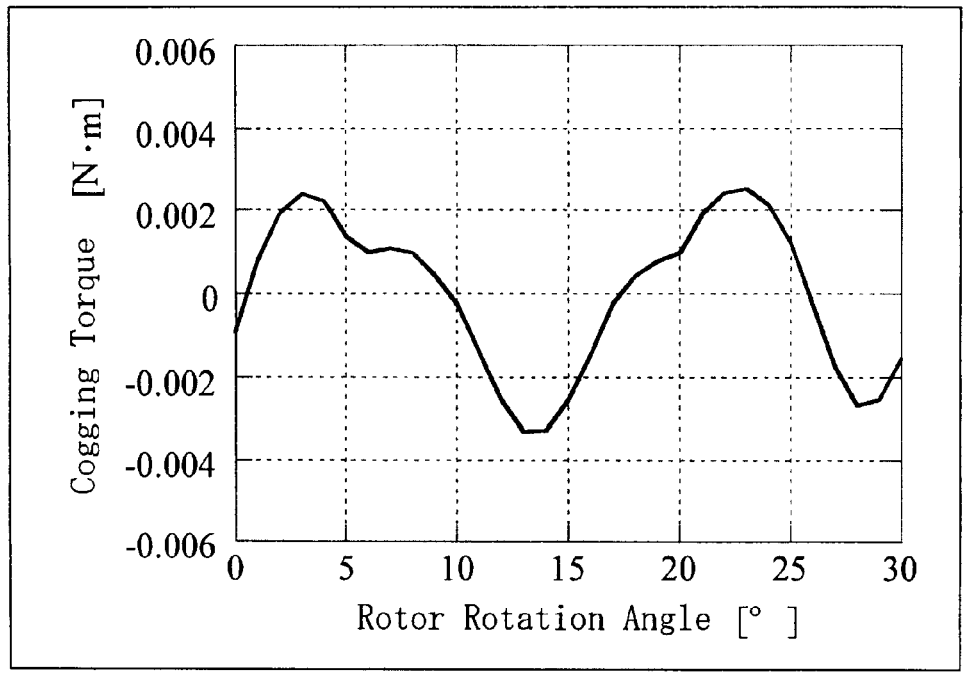
FIG. 14 is a chart showing a relationship between the rotation angle of the rotor and the cogging torque in the permanent magnet rotary motor of the third embodiment.
Figure 15:
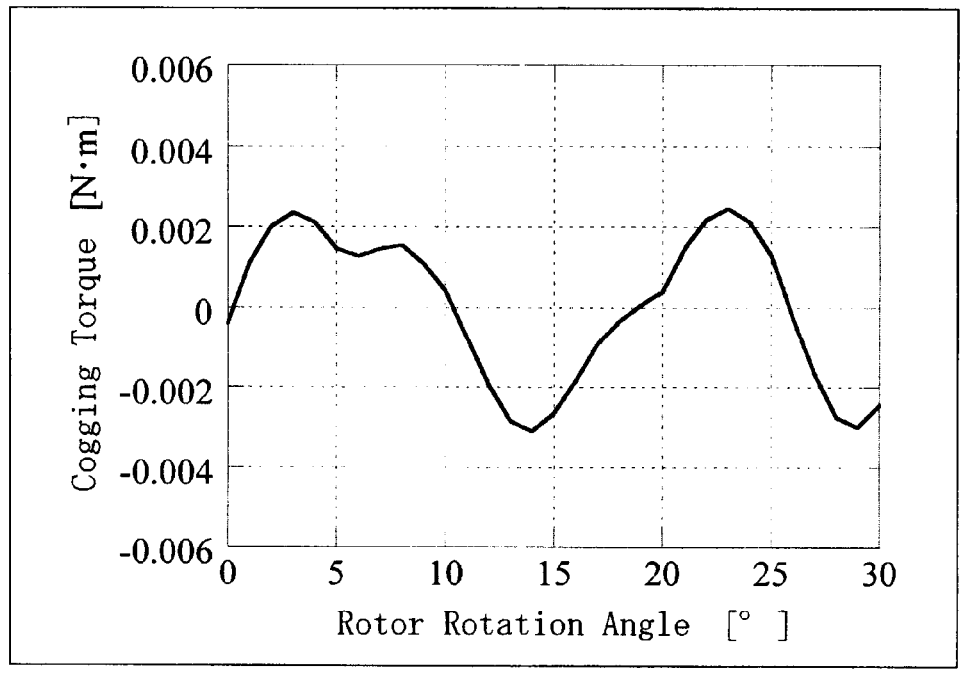
FIG. 15 is a chart showing a relationship between the rotation angle of the rotor and the cogging torque in the permanent magnet rotary motor of FIG. 11.
Figure 16:
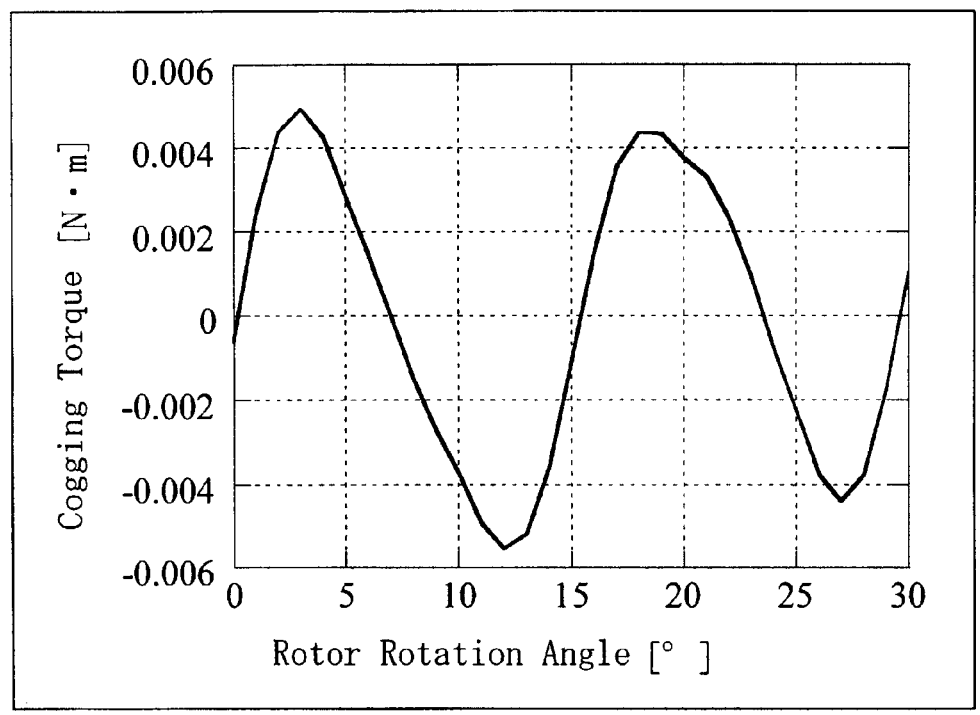
FIG. 16 is a chart showing a relationship between the rotation angle of the rotor and the cogging torque in a permanent magnet rotary motor of a comparative example 1 in which a magnetic pole constituent member is formed by overlaying only the first-kind magnetic pole constituent steel-plate layers shown in FIG. 4.
Figure 17:
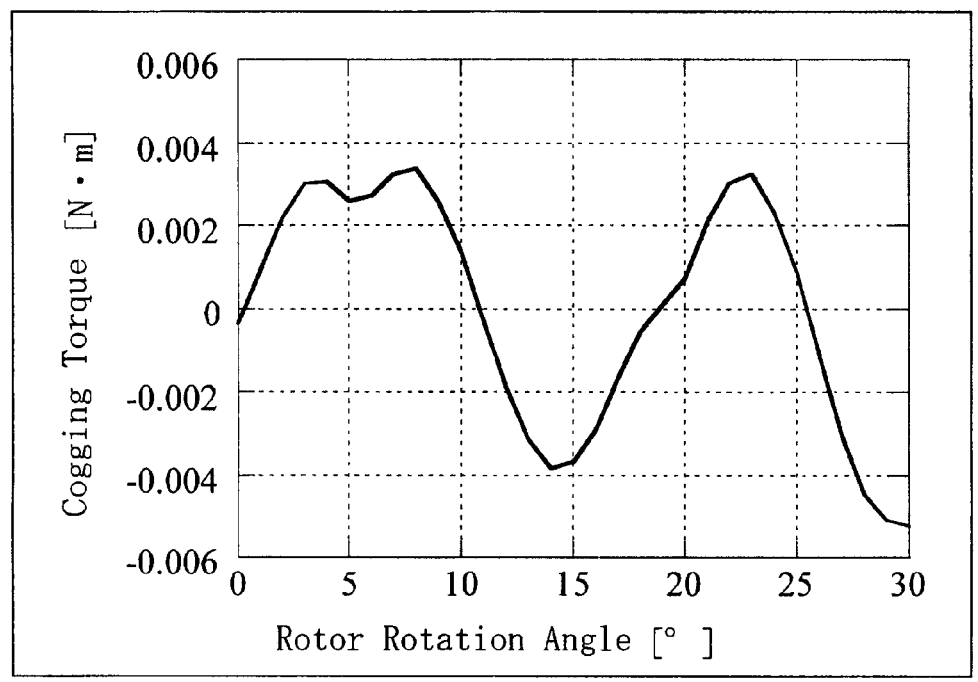
FIG. 17 is a chart showing a relationship between the rotation angle of the rotor and the cogging torque in a permanent magnet rotary motor of a comparative example 2 in which a magnetic pole constituent member is formed by overlaying only the second-kind magnetic pole constituent steel-plate layers shown in FIG. 5.
Figure 18:
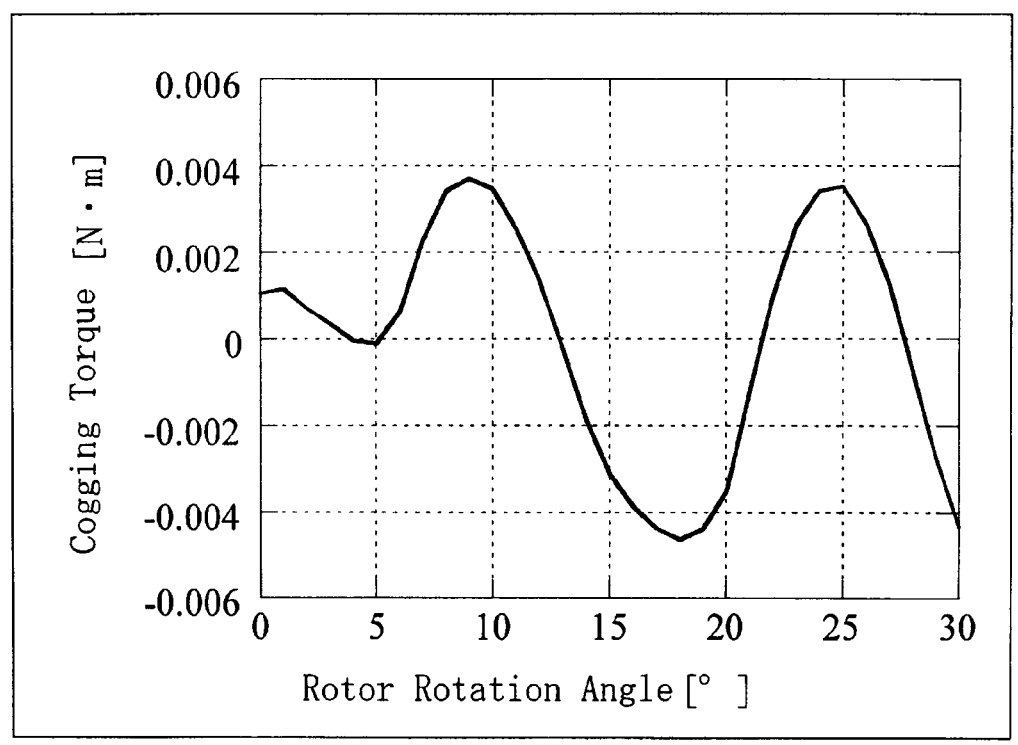
FIG. 18 is a chart showing a relationship between the rotation angle of the rotor and the cogging torque in a permanent magnet rotary motor of a comparative example 3 in which a magnetic pole constituent member is formed by overlaying only the third-kind magnetic pole constituent steel-plate layers shown in FIG. 6.

The permanent magnet rotary motors in accordance with the above-described first to third embodiments have been examined in respect of the cogging torque. FIGS. 12 to 14 respectively show the relationships between the rotation angle and the cogging torque of the rotor in the respective permanent magnet rotary motors according to the first to third embodiments. FIG. 15 shows a relationship between the rotation angle and the cogging torque of the rotor of a permanent magnet rotary motor of a varied or modified embodiment of the present invention shown in FIG. 11. FIG. 16 shows a relationship between the rotation angle and the cogging torque of the rotor of a permanent magnet rotary motor of a comparative example 1, in which the magnetic pole constituent member is formed by overlaying only the first-kind magnetic pole constituent steel-plate layers 27 shown in FIG. 4 (in this case, the connecting portions are all opened). FIG. 17 shows a relationship between the rotation angle and the cogging torque of the rotor of a permanent magnet rotary motor of a comparative example 2, in which the magnetic pole constituent member is formed by overlaying only the second-kind magnetic pole constituent steel-plate layers 29 shown in FIG. 5 (in this case, the connecting portions are alternately opened). FIG. 18 shows a relationship between the rotation angle and the cogging torque of the rotor of a permanent magnet rotary motor of a comparative example 3, in which the magnetic pole constituent member was formed by overlaying only the second-kind magnetic pole constituent steel-plate layers 29 shown in FIG. 6 (in this case, the connecting portions are all closed). FIGS. 12 to 18 demonstrate that, the cogging torque can be reduced in the permanent magnet rotary motors according to the first to third embodiments, compared to the permanent magnet rotary motors of the comparative examples 1 to 3, in which the magnetic pole constituent member is composed by overlaying only one of the first-kind, second-kind, and third-kind magnetic pole constituent steel-plate layers.

Further, the present invention is not limited to these embodiments, but various variations and modifications may be made without departing from the scope of the present invention.

The varied or modified embodiment of the present invention shown in FIG. 11 may be described below.

(1) A permanent magnet rotary motor, comprising:

a rotor including a rotary shaft, a rotor core fixed to the rotary shaft, and a plurality of permanent-magnet magnetic pole sections composed of a plurality of permanent magnets attached to the rotor core;

a stator core including an annular yoke, N (N is an even number of 4 or more) pole columns disposed inside the annular yoke at intervals in a circumferential direction of the yoke with one end of the pole column being connected to the yoke and the other end thereof being positioned on an inner side than the one end in a radial direction of the yoke, N magnetic pole surface constituent sections respectively formed on the other end of the N pole columns, each having on its inner side a magnetic pole surface facing the rotor, and N connecting portions connecting two adjacent sections among the magnetic pole surface constituent sections, and formed with one or more through-holes penetrating therethrough in the radial direction; and N exciting winding sections, respectively mounted onto N pole columns of the stator core, the N connecting portions including N/2 first type connecting portions and N/2 second type connecting portions, the first and second type connecting portions being alternately disposed in a circumferential direction of the rotor, wherein when an angle formed between two virtual lines respectively connecting a center of the rotary shaft and both ends, mutually opposed in the circumferential direction, of the first type connecting portion is defined as a first angle θ1 and an angle formed between two virtual lines respectively connecting the center of the rotary shaft and both ends, mutually opposed in the circumferential direction, of the second type connecting portion is defined as a second angle θ2, a relationship between the first angle θ1 and the second angle θ2 is θ1>θ2;

wherein a through-hole is formed in the first type connecting portion, extending from one end of the first type connecting portion in the axial direction of the rotary shaft toward the other end thereof;

wherein a through-hole is formed in the second type connecting portion, extending from the other end of the second type connecting portion in the axial direction toward the one end thereof;

wherein the length of the through-hole formed in the first type connecting portion is longer than the length of the through-hole formed in the second type connecting portion in the circumferential direction, and wherein each of the through-holes formed in the first and second type connecting portions extends a length equal to each other from the center position toward both sides in the axial direction.

What is claimed is:

1. A permanent magnet rotary motor, comprising:

a rotor including a rotary shaft, a rotor core fixed to the rotary shaft, and a plurality of permanent-magnet magnetic pole sections composed of a plurality of permanent magnets attached to the rotor core;

a stator core including an annular yoke, N wherein N is an even number of 4 or more pole columns disposed inside the annular yoke at intervals in a circumferential direction of the yoke with one end of the pole column being connected to the yoke and the other end thereof being positioned on an inner side than the one end in a radial direction of the yoke, N magnetic pole surface constituent sections respectively formed on the other ends of the N pole columns, each having an inner side magnetic pole surface facing the rotor, and N connecting portions connecting two adjacent sections among the magnetic pole surface constituent sections, and formed with one or more through-holes penetrating therethrough in the radial direction; and N exciting winding sections, respectively mounted onto N pole columns of the stator core, the N connecting portions including N/2 first type connecting portions and N/2 second type connecting portions, the first and second type connecting portions being alternately disposed in a circumferential direction of the rotor, wherein when an angle formed between two virtual lines respectively connecting a center of the rotary shaft and both ends, mutually opposed in the circumferential direction, of the first type connecting portion is defined as a first angle θ1 and an angle formed between two virtual lines respectively connecting the center of the rotary shaft and both ends, mutually opposed in the circumferential direction, of the second type connecting portion is defined as a second angle θ2, a relationship between the first angle θ1 and the second angle θ2 is θ1>θ2;

wherein one through-hole is formed in the first type connecting portion, extending from a center position of the first type connecting portion as viewed in an axial direction of the rotary shaft toward both sides in the axial direction;

wherein one through-hole is formed in the second type connecting portion, extending from a center position of the second type connecting portion as viewed in the axial direction toward both sides in the axial direction;

wherein the length of the through-hole formed in the first type connecting portion is longer than the length of the through-hole formed in the second type connecting portion in the circumferential direction; and wherein the length of the through-hole formed in the first type connecting portion is shorter than the length of the through-hole formed in the second type connecting portion in the axial direction.

2. The permanent magnet rotary motor according to claim 1, wherein a value ($\theta 2/\theta 1$) obtained by dividing the second angle $\theta 2$ by the first angle $\theta 1$ is within a range of $0.25<\theta 2/\theta 1<0.35$.

3. The permanent magnet rotary motor according to claim 1, wherein the angle range, measured in the circumferential direction, of the through-hole formed in the first type connecting portion is equal to the first angle $\theta 1$, the angle range, measured in the circumferential direction, of the through-hole formed in the second type connecting portion is equal to the second angle $\theta 2$.

4. The permanent magnet rotary motor according to claim 1, wherein the stator core comprises the yoke and a magnetic pole constituent member disposed inside the yoke;

wherein the magnetic pole constituent member is composed of first-kind, second-kind, and third-kind magnetic pole constituent steel-plate layers, the layers being respectively made of a magnetic steel-plate and including a pole column constituent portion partially constituting the pole column and a magnetic pole surface constituent portion partially constituting the magnetic pole surface constituent section, and being overlaid on one another;

wherein intermediate portions formed between two adjacent portions among the magnetic pole surface constituent portions included in each of the first-kind to third-kinds of the magnetic pole constituent steel-plate layers include first intermediate portions and second intermediate portions which have a different angle range measured in the circumferential direction;

wherein, in the first intermediate portion, an angle formed between two virtual lines respectively connecting a center of the rotor and two ends, mutually opposed in the circumferential direction, of the two adjacent magnetic pole surface constituent portions is a first angle $\theta 1$;

wherein, in the second intermediate portion, an angle formed between two virtual lines respectively connecting a center of the rotor and two ends, mutually opposed in the circumferential direction, of the two adjacent magnetic pole surface constituent portions is a second angle $\theta 2$ smaller than the first angle $\theta 1$;

wherein the first intermediate portions and the second intermediate portions are disposed alternately in the circumferential direction;

wherein both of the first and second intermediate portions of the first-kind magnetic pole constituent steel-plate layer are opened to partially form the through-holes;

wherein the first intermediate portions of the second-kind magnetic pole constituent steel-plate layer partially constitute the connecting portions and the second intermediate portions thereof are opened to partially form the through-holes;

wherein both of the first second intermediate portions of the third-kind magnetic pole constituent steel-plate layer partially form the connecting portions; and wherein the magnetic pole constituent member is composed of the third-kind magnetic pole constituent steel-plate layer, the second-kind magnetic pole constituent steel-plate layer, the first-kind magnetic pole constituent steel-plate layer, the second-kind magnetic pole constituent steel-plate layer and the third-kind magnetic pole constituent steel-plate layer which are overlaid on one another in this order so that the ratio for the number of the layers is 1:2:4:2:1.

5. A permanent magnet rotary motor, comprising:

a rotor including a rotary shaft, a rotor core fixed to the rotary shaft, and a plurality of permanent-magnet magnetic pole sections composed of a plurality of permanent magnets attached to the rotor core;

a stator core including an annular yoke, N wherein N is an even number of 4 or more pole columns disposed inside the annular yoke at intervals in a circumferential direction of the yoke with one end of the pole column being connected to the yoke and the other end thereof being positioned on an inner side than the one end in a radial direction of the yoke, N magnetic pole surface constituent sections respectively formed on the other ends of the N pole columns, each having an inner side magnetic pole surface facing the rotor, and N connecting portions connecting two adjacent sections among the magnetic pole surface constituent sections, and formed with one or more through-holes penetrating therethrough in the radial direction; and N exciting winding sections, respectively mounted onto N pole columns of the stator core, the N connecting portions including N/2 first type connecting portions and N/2 second type connecting portions, the first and second type connecting portions being alternately disposed in a circumferential direction of the rotor, wherein when an angle formed between two virtual lines respectively connecting a center of the rotary shaft and both ends, mutually opposed in the circumferential direction, of the first type connecting portion is defined as a first angle $\theta 1$ and an angle formed between two virtual lines respectively connecting the center of the rotary shaft and both ends, mutually opposed in the circumferential direction, of the second type connecting portion is defined as a second angle $\theta 2$, a relationship between the first angle $\theta 1$ and the second angle $\theta 2$ is $\theta 1>\theta 2$;

wherein a first through-hole is formed in the first type connecting portion, extending from one end of the first type connecting portion in the axial direction of the rotary shaft toward the other end thereof, and a second through-hole is formed in the first type connecting portion, extending from the other end of the first type connecting portion in the axial direction toward the one end thereof;

wherein a third through-hole is formed in the second type connecting portion, extending from one end of the second type connecting portion in the axial direction of the rotary shaft toward the other end thereof, and a fourth through-hole is formed in the second type connecting portion, extending from the other end of the second type connecting portion in the axial direction toward the one end thereof;

wherein the length of the first and second through-holes formed in the first type connecting portion is longer than the length of the third and fourth through-holes formed in the second type connecting portion in the circumferential direction; and wherein the length of the first and second through-holes formed in the first type connecting portion is shorter than the length of the third and fourth through-holes formed in the second type connecting portion in the axial direction.

6. The permanent magnet rotary motor according to claim 5, wherein a value (θ2/θ1) obtained by dividing the second angle θ2 by the first angle θ1 is within a range of 0.25<θ2/θ1<0.35.

7. The permanent magnet rotary motor according to claim 5, wherein the angle range, measured in the circumferential direction, of the through-hole formed in the first type connecting portion is equal to the first angle θ1, the angle range, measured in the circumferential direction, of the through-hole formed in the second type connecting portion is equal to the second angle θ2.

8. The permanent magnet rotary motor according to claim 5, wherein the first through-hole and the second through-hole are equal to each other in length in the axial direction, and the third through-hole and the fourth through-hole are equal to each other in length in the axial direction.

9. A permanent magnet rotary motor according to claim 5, wherein the stator core comprises the yoke and a magnetic pole constituent member disposed inside the yoke;
wherein the magnetic pole constituent member is composed of first-kind, second-kind, and third-kind magnetic pole constituent steel-plate layers, the layers being respectively made of a magnetic steel-plate and including a pole column constituent portion partially constituting the pole column and a magnetic pole surface constituent portion partially constituting the magnetic pole surface constituent section, and being overlaid on one another;
wherein intermediate portions formed between two adjacent portions among the magnetic pole surface constituent portions included in each of the first-kind to third-kinds of the magnetic pole constituent steel-plate layers include first intermediate portions and second intermediate portions which have a different angle range measured in the circumferential direction;
wherein, in the first intermediate portion, an angle formed between two virtual lines respectively connecting a center of the rotor and two ends, mutually opposed in the circumferential direction, of the two adjacent magnetic pole surface constituent portions is a first angle θ1;
wherein, in the second intermediate portion, an angle formed between two virtual lines respectively connecting a center of the rotor and two ends, mutually opposed in the circumferential direction, of the two adjacent magnetic pole surface constituent portions is a second angle θ2 smaller than the first angle θ1;
wherein the first intermediate portions and the second intermediate portions are disposed alternately in the circumferential direction;
wherein both of the first and second intermediate portions of the first-kind magnetic pole constituent steel-plate layer are opened to partially form the through-holes;
wherein the first intermediate portions of the second-kind magnetic pole constituent steel-plate layer partially constitute the connecting portions and the second intermediate portions thereof are opened to partially form the through-holes;
wherein both of the first and second intermediate portions of the third-kind magnetic pole constituent steel-plate layer partially form the connecting portions; and
wherein the magnetic pole constituent member is composed of the first-kind magnetic pole constituent steel-plate layer, the second-kind magnetic pole constituent steel-plate layer, the third-kind magnetic pole constituent steel-plate layer, the second-kind magnetic pole constituent steel-plate layer and the first-kind magnetic pole constituent steel-plate layer which are overlaid on one another in this order so that the ratio for the number of layers is 2:2:2:2:2.

10. A permanent magnet rotary motor, comprising:
a rotor including a rotary shaft, a rotor core fixed to the rotary shaft, and a plurality of permanent-magnet magnetic pole sections composed of a plurality of permanent magnets attached to the rotor core;
a stator core including an annular yoke, N wherein N is an even number of 4 or more pole columns disposed inside the annular yoke at intervals in a circumferential direction of the yoke with one end of the pole column being connected to the yoke and the other end thereof being positioned on an inner side than the one end in a radial direction of the yoke, N magnetic pole surface constituent sections respectively formed on the other ends of the N pole columns, each having an inner side magnetic pole surface facing the rotor, and N connecting portions connecting two adjacent sections among the magnetic pole surface constituent sections, and formed with one or more through-holes penetrating therethrough in the radial direction; and
N exciting winding sections, respectively mounted onto N pole columns of the stator core,
the N connecting portions including N/2 first type connecting portions and N/2 second type connecting portions, the first and second type connecting portions being alternately disposed in a circumferential direction of the rotor,
wherein when an angle formed between two virtual lines respectively connecting a center of the rotary shaft and both ends, mutually opposed in the circumferential direction, of the first type connecting portion is defined as a first angle θ1 and an angle formed between two virtual lines respectively connecting the center of the rotary shaft and both ends, mutually opposed in the circumferential direction, of the second type connecting portion is defined as a second angle θ2, a relationship between the first angle θ1 and the second angle θ2 is θ1>θ2;
wherein a through-hole is formed in the first type connecting portion, extending from one end of the first type connecting portion in the axial direction of the rotary shaft toward the other end thereof;
wherein a through-hole is formed in the second type connecting portion, extending from one end of the second type connecting portion in the axial direction toward the other end thereof;
wherein the length of the through-hole formed in the first type connecting portion is longer than the length of the through-hole formed in the second type connecting portion in the circumferential direction, and
wherein the length of the through-hole formed in the first type connecting portion is shorter than the length of the through-hole formed in the second type connecting portion in the axial direction.

11. The permanent magnet rotary motor according to claim 10, wherein a value (θ2/θ1) obtained by dividing the second angle θ2 by the first angle θ1 is within a range of 0.25<θ2/θ1<0.35.

12. The permanent magnet rotary motor according to claim 10, wherein the angle range, measured in the circumferential direction, of the through-hole formed in the first type connecting portion is equal to the first angle θ1, the angle range, measured in the circumferential direction, of the through-hole formed in the second type connecting portion is equal to the second angle $\theta 2$.

13. A permanent magnet rotary motor according to claim 10, wherein the stator core comprises the yoke and a magnetic pole constituent member disposed inside the yoke;

wherein the magnetic pole constituent member is composed of first-kind, second-kind, and third-kind magnetic pole constituent steel-plate layers, the layers being respectively made of a magnetic steel-plate and including a pole column constituent portion partially constituting the pole column and a magnetic pole surface constituent portion partially constituting the magnetic pole surface constituent section, and being overlaid on one another;

wherein intermediate portions formed between two adjacent portions among the magnetic pole surface constituent portions included in each of the first-kind to third-kinds of the magnetic pole constituent steel-plate layers include first intermediate portions and second intermediate portions which have a different angle range measured in the circumferential direction;

wherein, in the first intermediate portion, an angle formed between two virtual lines respectively connecting a center of the rotor and two ends, mutually opposed in the circumferential direction, of the two adjacent magnetic pole surface constituent portions is a first angle $\theta 1$;

wherein, in the second intermediate portion, an angle formed between two virtual lines respectively connecting a center of the rotor and two ends, mutually opposed in the circumferential direction, of the two adjacent magnetic pole surface constituent portions is a second angle $\theta 2$ smaller than the first angle $\theta 1$;

wherein the first intermediate portions and the second intermediate portions are disposed alternately in the circumferential direction;

wherein both of the first and second intermediate portions of the first-kind magnetic pole constituent steel-plate layer are opened to partially form the through-holes;

wherein the first intermediate portions of the second-kind magnetic pole constituent steel-plate layer partially constitute the connecting portions and the second intermediate portions thereof are opened to partially form the through-holes;

wherein both of the first and second intermediate portions of the third-kind magnetic pole constituent steel-plate layer partially form the connecting portions; and wherein the magnetic pole constituent member is composed of the third-kind magnetic pole constituent steel-plate layer, the second-kind magnetic pole constituent steel-plate layer and the first-kind magnetic pole constituent steel-plate layer which are overlaid on one another in this order so that the ratio for the number of layers is 2:4:4.

* * * * *

UNITED STATES PATENT AND TRADEMARK OFFICE
CERTIFICATE OF CORRECTION

PATENT NO. : 7,528,519 B2
APPLICATION NO. : 11/532932
DATED : May 5, 2009
INVENTOR(S) : Miyashita It is certified that error appears in the above-identified patent and that said Letters Patent is hereby corrected as shown below:

On the Title Page, in the ABSTRACT, Line 19, delete "H2" and insert --H1--.

Signed and Sealed this

Twenty-third Day of June, 2009

JOHN DOLL
*Acting Director of the United States Patent and Trademark Office*